(12) United States Patent
Weiss

(10) Patent No.: US 8,113,108 B2
(45) Date of Patent: Feb. 14, 2012

(54) METHOD AND DEVICE FOR STORING, TREATING AND DISPENSING ITEMS OF FOOD BY MEANS OF SUPPORTS

(76) Inventor: Reinald Weiss, Kressberg (DE)

( * ) Notice: Subject to any disclaimer, the term of this patent is extended or adjusted under 35 U.S.C. 154(b) by 586 days.

(21) Appl. No.: 11/908,562

(22) PCT Filed: Mar. 13, 2006

(86) PCT No.: PCT/EP2006/060660
§ 371 (c)(1),
(2), (4) Date: Sep. 13, 2007

(87) PCT Pub. No.: WO2006/097448
PCT Pub. Date: Sep. 21, 2006

(65) Prior Publication Data
US 2008/0163762 A1 Jul. 10, 2008

(30) Foreign Application Priority Data
Mar. 16, 2005 (DE) .......................... 10 2005 012 536

(51) Int. Cl.
*A21B 1/48* (2006.01)
*A21B 1/00* (2006.01)
(52) U.S. Cl. ............ 99/443 C; 99/467; 99/386; 99/477; 219/388; 219/400; 126/21 A
(58) Field of Classification Search .................... 99/443, 99/443 C, 467, 360, 365, 367, 371, 386, 423, 99/427, 443 R, 478, 479; 426/523; 198/465.1–465.3
See application file for complete search history.

(56) References Cited

U.S. PATENT DOCUMENTS

| 3,202,115 | A | | 8/1965 | Jones, Jr. | |
| 3,941,232 | A | * | 3/1976 | Parkes | 198/834 |
| 4,687,119 | A | * | 8/1987 | Juillet | 221/101 |
| 5,619,911 | A | * | 4/1997 | Voegtlin | 99/443 C |
| 2006/0137538 | A1 | | 6/2006 | Anderl | |

FOREIGN PATENT DOCUMENTS

| DE | 203 02 346 U1 | 5/2003 |
| EP | 0 478 085 | 4/1992 |
| FR | 2 824 168 | 10/2002 |

OTHER PUBLICATIONS

PCT International Search Report, Jul. 11, 2006.
German Patent Office Search Report, Jan. 19, 2005.
International Preliminary Report on Patentability, Oct. 11, 2007.

* cited by examiner

*Primary Examiner* — Henry Yuen
*Assistant Examiner* — Jianying Atkisson
(74) *Attorney, Agent, or Firm* — Dority & Manning, P.A.

(57) ABSTRACT

The invention relates to a device for storing, treating and dispensing items of food, especially baked products, which device comprises at least two sections (2, 3). The inventive device is characterized by a plurality of supports (12) for receiving the items of food (9, 10) and a transport device (17, 20, 21, 22) that configures a closed transport cycle of the supports (12) between the sections (2, 3).

16 Claims, 5 Drawing Sheets

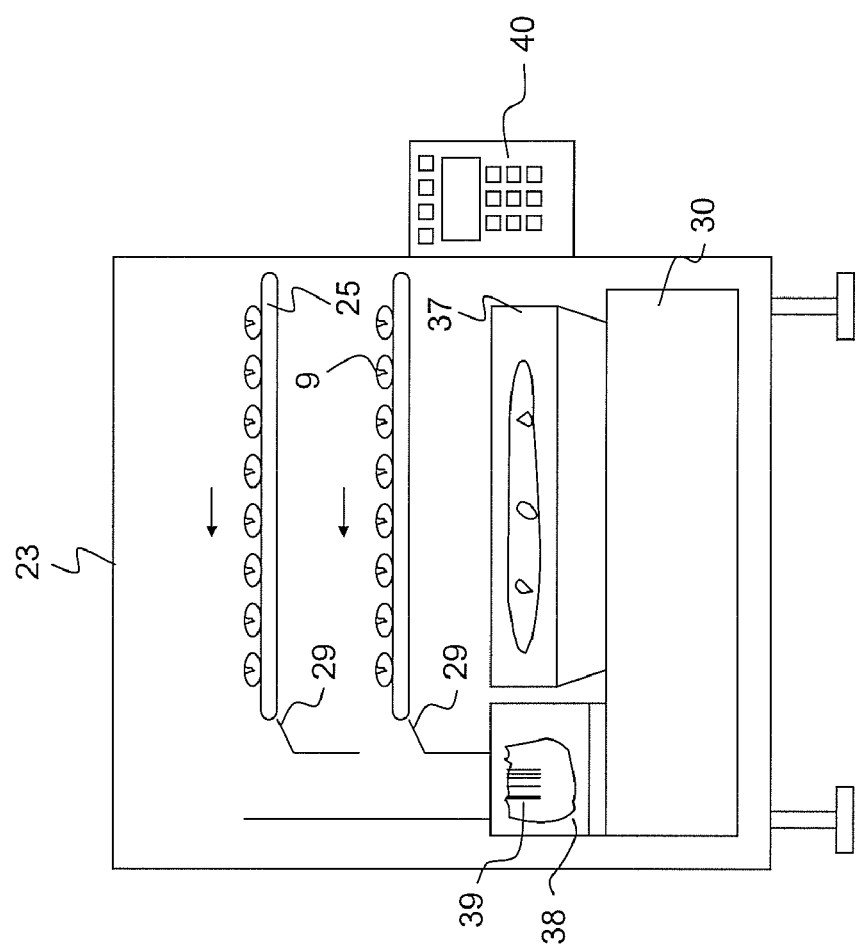

METHOD AND DEVICE FOR STORING, TREATING AND DISPENSING ITEMS OF FOOD BY MEANS OF SUPPORTS

FIELD OF THE INVENTION

The invention relates to a device for storing, treating and dispensing food items, especially baked goods, consisting of at least two sections. In addition, the present invention also relates to a device for storing, treating and dispensing food items in which the latter are subject to a treatment so they can reach a state ready for consumption and dispensing.

BACKGROUND

The sale of food items such as baked goods, for example, is done in a conventional way though specialized outlets like bakeries or—in the case of meat and sausage—in butcher shops. Increasingly, however, their sale takes place though other outlets like supermarkets, but various requirements result from this. One requirement is that the sale must be as economical as possible. In addition, the baked goods must look attractive and be as fresh as possible. With regard to the first requirement, the use of automated devices has increased to reduce personnel costs. However, as far as cost assessment is concerned, the space needed for such a device is an important consideration. Modern supermarkets, for example, determine a parameter for this purpose that is used for calculating and monitoring the ratio of sales area and turnover with the aim of achieving the highest possible turnover per available unit/sales area.

Also important is an attractive and safe availability and dispensing of the food items from the viewpoint of food processing. Examples of this are baking ovens set up in the supermarket sales areas, where they are filled and emptied by the sales staff. These sales methods have the disadvantage that dirt is generated in the sales room, every customer has potential access to the baking room, many salespeople are needed for dispensing, and several customers can touch the goods.

SUMMARY

Therefore, the task of the present invention is to provide a food-processing device and process with which food items can be safely and economically be made available to customers in the most attractive manner possible. Additional objects and advantages of the invention will be set forth in part in the following description, or may be obvious from the description, or may be learned through practice of the invention.

This task is solved by means of a device of the type mentioned above, characterized in that it foresees numerous supports for receiving the food items and a transport device that creates a closed transportation circuit for the supports located between the sections. The closed transport circuit set-up has several advantages. One of them is that empty supports do not accumulate in a part of the device, but they keep circulating regularly within it. In this case, the emptied supports can reach the point where they can be filled once again in order to restart the treatment of food items until they finally reach one of the dispensing points again. The use of many supports also allows one to manipulate numerous products simultaneously within the device.

It has been demonstrated in the preparation of baked goods that it is especially advantageous if a section of the baking oven is a continuous baking oven in particular. Such baking ovens are very reliable, need little maintenance and also have sufficiently large capacity when demand is high. In addition, continuous baking ovens can be easily loaded and unloaded automatically. Very economical designs of a device according to the invention have the advantage that they can be manually stocked. This can be done, for example, by means of a baking oven that can be manually stocked. As a result of this, the time and expense for setting up the device can be cut down for the other required automated devices. For other applications with an especially high degree of automation (and therefore, of personnel reduction) as an objective, an automatic stocking of the device or baking oven can be foreseen.

For on-site operation, it is particularly advantageous if a section is used for support storage. For example, if the device is executed in two sections, one consisting of the baking oven and the other of storage for the supports, then it is possible to prepare the food items on the supports in the baking oven first, and then to have them ready on the supports in the storage section for further processing or dispensing.

In this case, it is advantageous for the storage section to be executed as a dispensing-storage section. This means that the storage section can have, for example, a dispensing part and, if necessary, a handling part plus a transport device for transporting the food items on the supports to the dispensing section.

It has also proven to be advantageous for a storage section to be executed as a feeding storage section. This means that such a storage section would be especially suitable for receiving the unprocessed or only partly processed food items. The food items left on supports in the feeding storage section are kept there until a request comes in and they are transported by the transport device for treatment, which can take place in the baking oven mentioned above, for example.

It has been proven to be especially advantageous for the quality of food items if at least one of the storage sections is climate controlled. In the case of the feeding storage section, this can be done with a cooling device to ensure the freshness of the outgoing products for a longer period as well. In the case of the dispensing-storage section, climate control is achieved with a heater to keep the freshly prepared food items warm for a certain period after preparation. Additionally, however, dehumidifiers or humidifiers can be foreseen as long as they are advantageous for the properties of the food items. The use of protective gases for maintaining food item quality can also be considered.

It is practical for every transport device to have numerous supports for receiving the food items. This would allow different kinds of food items to be transported on different supports.

Therefore, it is advantageous for the storage sections used to have numerous storage spaces for supports so they can be stored accordingly. If numerous supports are used, it has also proven to be advantageous to allocate at least some helpful information to every support, especially information about running time, type of loading or momentary location—even information about loading and unloading makes sense for certain applications. As a result of this, the management of the supports is greatly facilitated, in that for example the support with the requested type of food item located closest to the dispensing place can be determined and transported there. With respect to other criteria, one must make sure, for example, that the food item of the requested type that sits longest in the dispensing unit is dispensed first. In addition, this also allows one to determine the type of food item that is exactly requested. This is advantageous because the supports can be executed uniformly to save money and designed in such a way that they can receive all types of food items under consideration.

A storage section with several levels on top of one another would really save a lot of space because many food items could be stored in a relatively small area. The savings in area is especially important when setting up sections of the device in sales rooms, since only little expensive selling area is needed for offering large quantities of food items.

It has been particularly advantageous for the flexibility of the device if the supports are not connected to each other. This offers the largest possible flexibility when handling the filled or empty supports. Thus, almost any desired support can be accessed. If desired, supports can be moved beside other supports and stored again in another place. By doing this it would be possible, for example, to select the filled supports located in a storage section according to the most varied criteria. One of these criteria could be to dispense the food items that have been stored the longest first. Another criterion, however, could also be to dispense a certain kind of food items. Thanks to the existing flexibility, one could access the respective selected support while preventing an interfering coupling of the supports with one another.

It has been demonstrated to be particularly favorable for the transport device located near the baking oven to be equipped with a conveyor belt, band or chain. Such a transport device would be especially sturdy, low-maintenance, long-lived and heat-resistant. In addition, it would be possible to transport the supports through the baking oven in the simplest way by just placing them on the conveyor belt.

With respect to food item quality, it has been demonstrated to be advantageous for the supports to run at least once through the heated section of the baking oven in every complete pass of the transportation cycle. The heating up of the supports to high temperatures reaching 200° C. and more kills germs and prevents the formation of other undesired impurities such a fungi, thus conferring the supports some degree of sterility.

An advantageous execution of the conveyor foresees it to have at least one collection device for selectively receiving or delivering one or several supports in the storage section. Such a collection device could, for example, grab the supports stored in several levels on top of each other and place them afterwards on the continuous band of the continuous baking oven. However, such a collection device could also be placed on the opposite side of the continuous baking oven in order to selectively place the supports coming out of the continuous oven in a dispensing storage section. Thus, the collection device serves the purpose of providing selective access to individual supports located within the storage sections.

It has proven to be extremely advantageous if there is at least one structural separation with a connecting opening between two sections to facilitate the placing of one section in a sales room and the second section in a storage room located behind it, for example. As a result of this arrangement, important parts of the device are stored away from the sales room and valuable sales area is saved. In addition, the filling or stocking of the device can take place in the storage side, thereby preventing dirt that originated in the store area from entering.

With respect to safety regulations, it is also advantageous if an autonomous, self-activating fire protection installation is placed at least between two sections. Such a fire protection installation can consist of a trap door that autonomously closes the connecting opening of the structural separation located between the sections in case of a fire. This installation can effectively prevent a fire from extending into the sales room from a storage room or vice versa. Additionally, the device according to the invention can also be used in conditions when the use of such a fire protection installation is required. This can be the case if fireworks are stored in one of the rooms, for example.

To improve the handling of the device according to the invention it has been proven to be advantageous if a support-removal device is foreseen to remove the supports that circulate in the transport cycle. Such a support removal makes a lot of sense when the supports are empty. Therefore, support removal is desired, for example, when they must be cleaned externally with a dishwasher, for example. In this case, the user can hand out the supports in a specific place and then have them collected for subsequent cleaning. A second, particularly favorable execution form of the invention, consists of inserting a manual stocking in the transport cycle of the supports. Here, the user takes the supports that were automatically handed out and collected, stocks them again and takes them back to the transport device's access area. Such a device represents a particularly good compromise in facilities with the kind of capacity designed and suitable for supermarkets, for example. In this case, stocking can be done quickly and economically by hand, while the device carries out the other activities.

To facilitate handling and cut down operating time, it is highly advantageous if media for automatically emptying the supports are foreseen. Thus, at closing time, the food items that are not ready or partly ready from the task device are taken out. Instead of doing this manually, an opening in the task device can be foreseen where all food items remaining in the respective transport device are handed out after using the device accordingly. These items could be stored in a cooling room until the following day, when they are handed out again. The same applies for finished products still remaining in the transport device or storage section of the device at closing time. In this case, it may be possible to foresee the distribution either through the usual way or a separate collection, if one chooses to do so.

Apart from emptying the device, it is advantageously foreseen for the transport cycle of the transport device to pass through a cleaning device, especially a cleaning bath. In this case, the cleaning device can be executed so that it separately cleans the empty supports that have stopped in front of it or the empty ones passing through. This can be done with pressurized air or brushes. Another possible design foresees the cleaning device to be activated and clean all supports only after the entire section to be cleaned has been emptied. This kind of cleaning can once again be automated and take place at night, for example. When cleaning sections without food items, it is also possible to use jets of cleaning fluid or water.

In alternative embodiments, the food items are distributed among numerous independent supports. Afterwards, the stocked supports are kept in a storage section and, if needed, are fed into the baking oven with the help of a transport device for preparation and immediate dispensing thereafter or kept (in an additional step) in a dispensing storage section for dispensing purposes. In this case, the supports emptied upon dispensing are moved in a closed transport cycle. The advantages according to the invention that were mentioned above can also be achieved with the process according to the invention.

Aspects of the invention are described in connection with the drawing and the practical examples listed below, which show:

BRIEF DESCRIPTION OF THE DRAWINGS

FIG. 3: a frontal view of a dispensing storage section according to the invention;

DESCRIPTION

Figure 1:
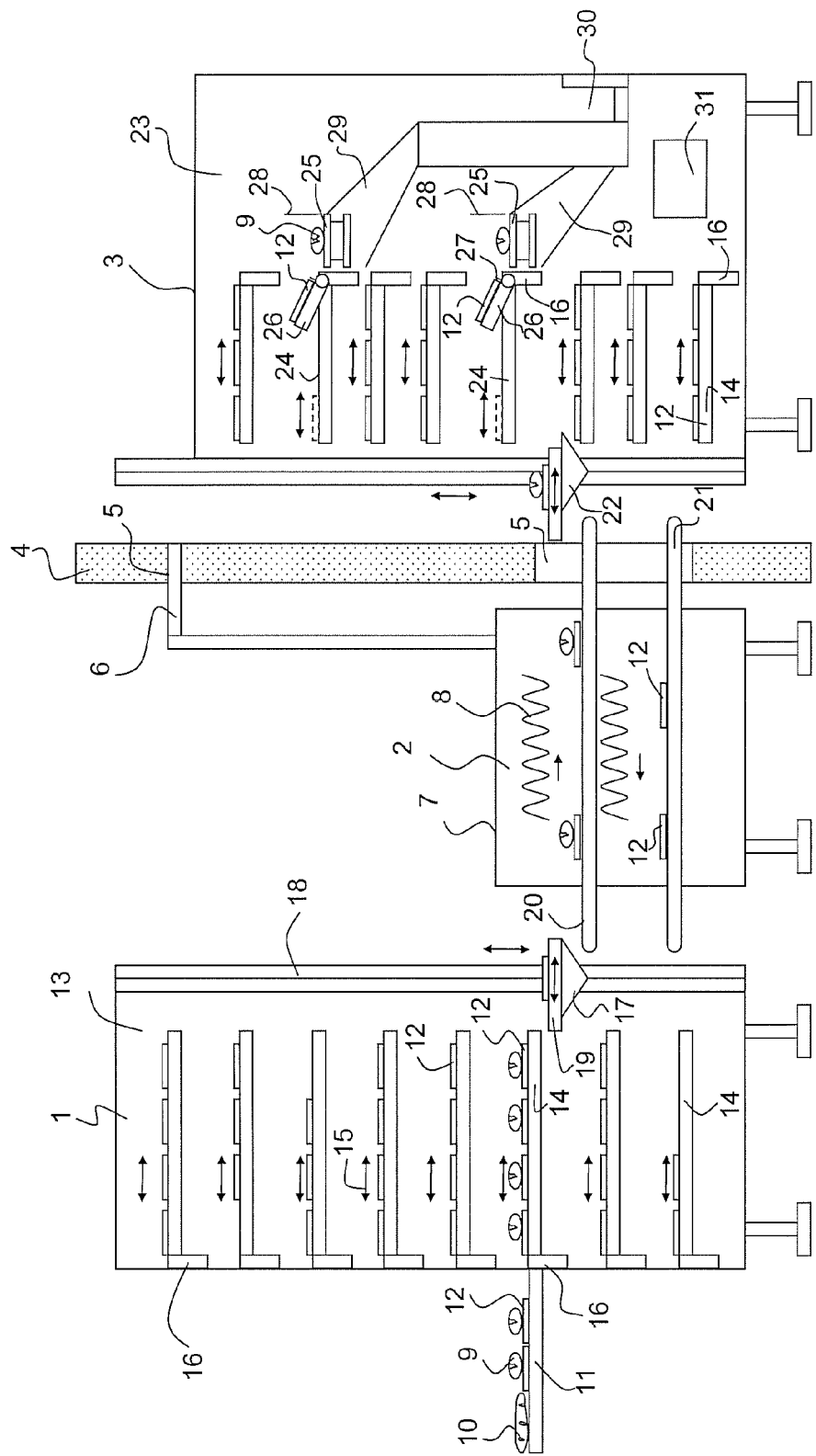
FIG. 1: a lateral sectional view of a first embodiment of a device according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a lateral sectional view of a device according to the invention for storing, handling and dispensing food items. The present device consists of three sections 1, 2, and 3. Between the second section 2 and the third section 3, a structural separation shaped like a wall 4 has been placed. To the left of the wall 4 there is a storage section and on the right side a sales section. The wall 4 has a connecting opening 5 through which the second section 2 and the third section 3 are connected to each other.

An air exhaust pipe 6 with the function of pushing out the outgoing air generated in the second section 2 to the upper side of the third section 3 extends through a second connecting opening 5 arranged above the first. It has been determined that a foreseen air conduction device that pushes air from a section, such as from a continuous baking oven 7, into the sales room promotes sales (at least for a while) and is therefore advantageous. The customer perceives the smell of freshly baked goods very intensively and is then made aware of their availability. This promotes product sales and creates an area that the general public perceives as nice-smelling. To prevent the clientele in the sales area from perceiving an overpowering smell or feeling excessive temperatures such as those occurring in the summer, for example, it is foreseen for the air coming from the continuous baking oven 7 or the third section 3 to be blown out selectively through a second means not directed to the sales area and, if possible, directly towards the exterior.

In the represented embodiment, heating spirals have been installed in the roof and floor of the continuous baking oven 7. As far as the invention is concerned, it is totally unimportant if the heating source is electric, gas or another one. It can be seen very well in FIG. 1 that a lot of structural space has been saved to the left of the wall 4, which is the sales area. The devices not needed in the sales area have been moved to an area to the left of the wall 4. This area can be, for example, a storage room or another room outside of the sales area not accessible to the general public. As a result of this, a significant portion of the sales area can be used for other purposes and impurities caused during stocking of the device, for example, are no longer present.

Basically, the operation consists of the food items being transported from left to right. In this case, the food items are rolls 9 and baguettes 10. They are placed on the task table 11 and then either manually or automatically on supports 12. The first section 1 arranged to the left of the continuous baking oven 7 has been executed as a feeding storage section 13. In other words, this is where the half-prepared or untreated food items are stored before they undergo treatment in the continuous baking oven 7. The feeding storage section has, for this purpose, several storage levels 14 arranged on top of each other. Every storage level 14 in the illustrated embodiment can take at most four supports 12, which can travel horizontally on every storage level 14 along the arrows 15. The horizontal movement of the supports 12 is driven by the storage mechanisms 16 arranged in each storage level 14. The storage level 14, located at the same height as the task table 11, serves as the feeding entrance to the illustrated embodiment. The operator places the rolls 9 or baguettes 10 on the task table 11 and supports 12 and pushes them to the right, to the storage level 14, from which they continue moving through the storage mechanism 16 to the right. In this way, an operator can feed fresh food items into the feeding storage section 13 together with the supports.

Once there, the stocked supports 12 are subsequently transported with the help of a collection device 17 located to the right of the feeding storage section 13. The collection device 17 can be moved both horizontally and vertically. The vertical displacement movement can take place along a rail 18, for example. To reach the supports 12 located all the way to the right of the storage levels 14, a lifter 19 that is part of the collection device 17 is moved first horizontally to the left under the supports 12 to be lifted and then downwards, together with the collection device 17, in order to lift the respective support 12. This is how the support 12 is lifted from the corresponding storage level 14. The transported support 12 is set down following the reverse procedure by placing it on an upper transport band 20 of the continuous baking oven 7. The device can be executed in an especially compact way if the collection device 17 grabs around the storage levels 14 from the exterior or through them. The same also applies to the combination of the collection device 17 with the upper transport band 20 or a lower transportation band 21 also foreseen for the continuous baking oven 7 on which the emptied supports 12 can be transported back to the feeding storage section 13.

Therefore, the supports 12 that the operator has stocked and fed with the help of the collection device 17 can be distributed and be ready within the feeding storage section 13. When a request comes in, the collection device 17 transports the stocked supports 12 to the upper transport band 20 so they can pass through the continuous baking oven 7. A second collection device 22 located to the right side of the transport bands 20, 21 has been foreseen for transporting the stocked and treated food items together with the supports 12 in section 3 executed as dispensing storage 23. Within the dispensing storage 23, several storage levels 14 have been in turn arranged on top of each other. The storage levels 14 in the dispensing storage 23 have room for a maximum of three supports 12 placed side by side in the illustrated embodiment. These storage levels are also equipped with a storage mechanism 16 that can move the supports 12 placed on it horizontally back and forth. In addition, the dispensing storage 13 has two more unloading levels 24 on which the supports 12 can be unloaded on dispensing bands 25 if necessary. To achieve this, the supports 12 are set down on the dispensing level 24, moved to the right with the help of the dispensing mechanism 16 and placed there on a tilting device 26 that tilts the food items placed on the supports 12 and sets them down on the dispensing band 25. Advantageously, a dispensing band 25 has been foreseen for every kind of food item to be produced, so that the dispensing of the respective food item desired can be controlled very easily via the mechanism of the filled dispensing band 25. If Product A has been requested, the dispensing band containing only Product A is set into operation so that only the requested product is transported. On the right side of the tilting device 26, a stop 27 has also been placed to prevent an empty support 12 from sliding off to the dispensing band 25. The wall 28—arranged in each case to the right of the dispensing band 25—prevents food items from uncontrollably reaching the inner space of the dispensing storage 23.

From the dispensing bands 25, the food items subsequently reach the funnels 29 that lead to the dispensing compartment 30. Once there, the customer can take them. A controller 31—that can be advantageously executed as a programmable electronic control—controls the entire device.

After the supports 12 have been emptied, they can still be kept in the dispensing storage 23 if needed. Otherwise, the second collection device 22 transports the empty supports back to the lower transportation band 21, which keeps transporting them towards the feeding storage section 13. This completes the closed circuit, in which the supports 12 move around while transporting food items from the feeding storage section 13 towards the dispensing storage 23.

If the requested number of pieces varies greatly or there are rather large differences in the geometric dimensions of the products, it is advantageous for the dispensing device to have one dispensing spot per product. Thus, a dispensing spot can be optimized with regard to dispensing the longer baguette and a smaller number of pieces, whereas on the other hand another dispensing spot would be optimally adapted to the geometric dimensions of rolls so it can dispense them in larger numbers For a profitable operation of the device according to the invention, it has proven to be highly advantageous if a controller, especially an electronic control, is foreseen so the functions in one or more sections can be controlled. Programmable electronic controls in particular can also take over complex tasks with utmost precision and reliability if programmed the right way. Their use can save a lot of personnel and also significantly increase the precision with which functions are controlled.

A possible function in this case would be the support monitoring for which the controller is advantageously equipped with a processing device for processing the information assigned to the supports. Such a processing device can consist, for example, of a computer system and its related software so the type of support loading, location within the device, treatment status and length of stay can be monitored. If certain goods are requested or the respective time limits are exceeded, the controller can then start activating the corresponding movements of the transport devices or the entire device. As already indicated above, different criteria can be defined on request. Thus, a controlling criterion can foresee the transport of available supports of the dispensing device as quickly as possible or another control criterion can dispense the supports carrying the desired kind of goods that have been lingered the most in the device. Yet another control criterion can foresee the exchange of certain or all relevant goods after a total lingering time has been exceeded. These are, needless to say, only a few examples out of many possible control possibilities.

For improved information processing, a memory device assigned to the supports has been additionally foreseen in the controller for storing information. Advantageously, such information is for this purpose already collected and stored away during stocking or entry of the stocked supports in the memory. This information can contain, for example, the type of piece goods, task time of the goods, number or designation of the stocked support and the like. In addition, however, newly generated information can be added on while processing the goods. If, for example, the goods are transferred from one support of the first transport device to a support of the second transport device, then the change in the support designation that has taken place must be correspondingly recorded. Advantageously, the controller is equipped with a time-capture mechanism for the chronological monitoring of the passage of the supports.

In order to optimize the availability of the food items offered or to prevent or minimize wasted goods, it is particularly advantageous for the controller to be equipped with a consumption monitoring or analysis program. For this purpose, it is especially advantageous if the quantities of the types of goods sold can be determined though simple counters or electronically from the controller. This can be done in any desired temporal units—monthly, weekly, daily, hourly or even shorter time increments. In this case, the shorter the time period during which a treated food item is regarded as fresh, and the longer the time period needed for preparation, the more impact will such a consumption analysis have on the profitability of a device according to the invention. Thus, with the help of the experimental values determined over a certain time period for every kind of food item, the average demand can be found out. From this, daily demand can be derived, which would then serve as basis for the ordering quantities of the fresh goods that must be supplied every day. For example, if the analysis indicated that Product A is regularly sold 300 times on a first weekday and 500 times on a second weekday, then the order to be submitted the day before will be adjusted accordingly for that weekday. Thus, it is ensured that there will always be enough goods available with little or no waste at all. Furthermore, it is also possible to estimate more precisely the distribution of daily demand during the day and to supply and analyze it. For example, if such an analysis reveals that Product A is requested at a time of the day when there is low demand (between 1 and 4 p.m., for example) then it makes no sense to have the double or triple amount of this freshly prepared Product A in a dispensing device. As a result of this, a continuous supply of freshly prepared product is always available. If, for example, demand increases suddenly after 5 p.m. to 200 units per hour, then the corresponding production can be started 15 minutes earlier, at around 4:45 p.m., to ensure enough product availability. Therefore, the use of self-learning programs is particularly suitable because the quantity produced by means of ever more precise iterative optimization steps comes increasingly closer to meeting actual demand over the course of time without the need of an operator.

Apart from fluctuating demand for an individual product, the fluctuating demand for two products or more can also be considered in this way. Thus, for example, if there is one main demand time in the morning and another one in the evening, then it can be taken into account if Product A is very much in demand in the morning but not so Product B, whereas on the other hand the situation is reversed in the evening (strong demand for Product B, little demand for Product A). With such a consumption monitoring and analysis—which is also preferentially set up to be self-learning (i.e. dynamic)—the quantity of produced or pre-produced food items can be optimally and individually controlled for every sales site.

Regarding the operation of the device according to the invention, it would also be advantageous for the controller to be equipped with dispensing media for dispensing or indicating the available supply left. The indication of supply can be given in absolute numbers or as remaining residual duration for the respective types of food items. An operator would then be able to recognize how many pieces of a certain product remain or how long the existing supply will last.

Since energy costs also make up a significant portion of the operating costs of the device according to the invention, it is especially practical for the controller to be connected to the baking oven so the heating devices arranged therein can be turned off. With this arrangement, the energy costs of the device can be lowered significantly during longer time periods of little or no demand.

Figure 2:
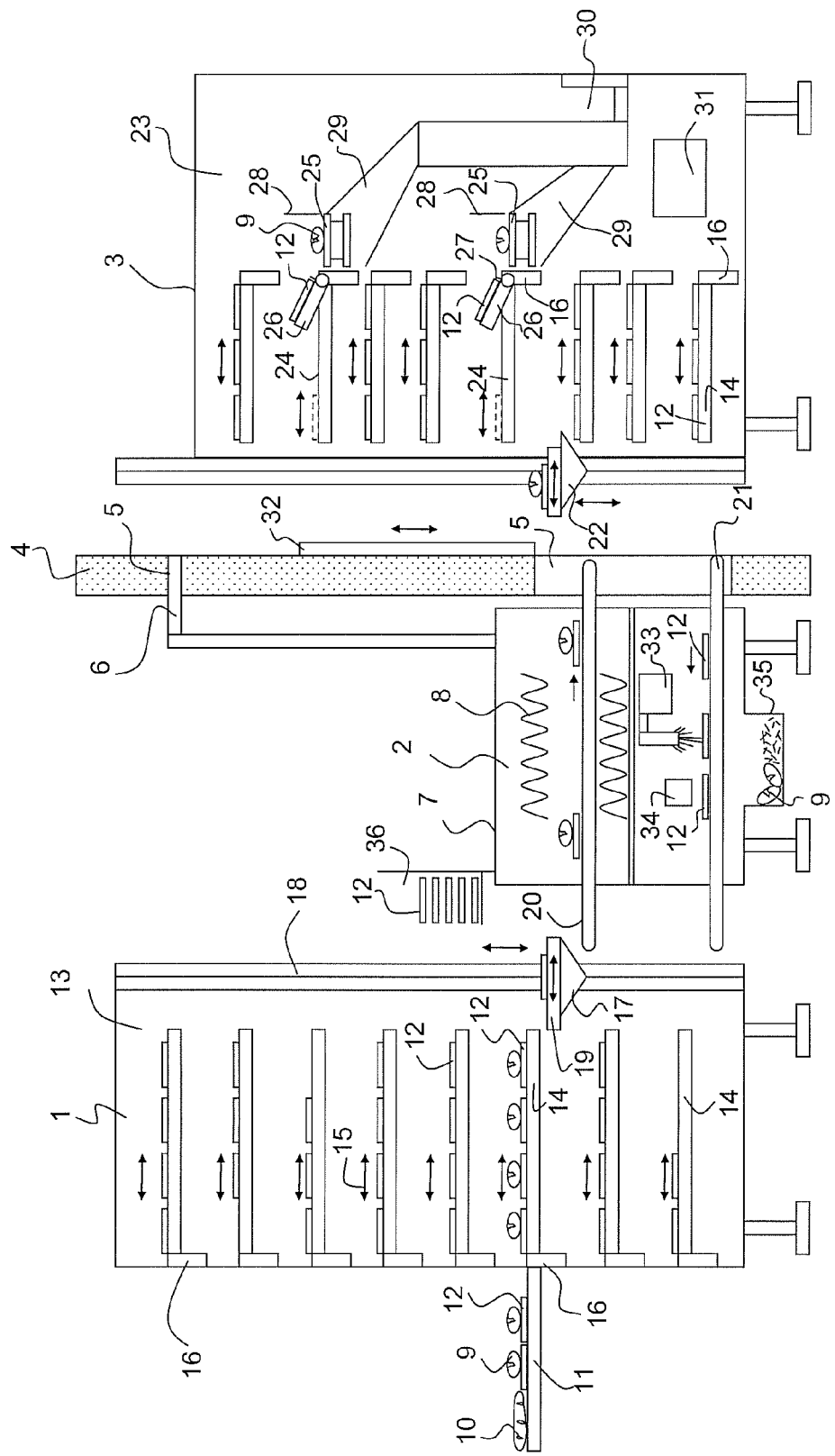
FIG. 2: a lateral sectional view of a second embodiment of a device according to the invention.

FIG. 2 shows another embodiment according to the invention, which is in turn shown in a lateral sectional view. The design of the feeding storage section 13 and of the dispensing storage 23 corresponds mostly to the arrangement described in FIG. 1 above. In addition, this embodiment is equipped with a fire protection device 32 located in the wall 4. The fire protection device 32 consists of a door that can be moved downward vertically, activated in case of a fire to close tightly the lower connecting opening 5. This is needed, for example, when flammable merchandise such as fireworks or flammable substances are stored in a sales room or warehouse. This effectively prevents a possibly occurring fire to spread through the connecting opening 5 to the adjoining room. Needless to say, the fire protection device 32 can also be executed in such a way that it closes both the upper and lower connecting opening 5 in case of fire.

Furthermore, an additional cleaning device 33 and an unloading device 34 are foreseen for this embodiment in the transport cycle. Both devices are located in the lower part of the continuous baking oven 7 directly above the lower transportation band 21. Using the cleaning device 23, the impurities in the returning empty supports 12 can be cleaned, which then accumulate in a collecting container 35 located below the continuous baking oven 7. Apart from that, however, food items that are too old such as rolls 9 that remained too long in the dispensing storage section 23 can be taken off the supports 12 with the help of the unloading device 34 formed like a slide. These rolls also accumulate in the collecting container 35 located below the continuous baking oven 7. In this way, both the cleaning and unloading of the supports 12 can be automated as much as possible. To simplify the operation, it has also been foreseen for the first collection device 17 to receive the supports 12 arriving at the left side of the lower transportation band 21 and to deposit them in a storage section executed as empty support storage 36. The operator can receive the cleaned and emptied supports 12 there in order to restock them on the task table 11 and introduce them to the feeding storage section 13. Naturally, there are many different possibilities available for executing the cleaning device 33 or the unloading device 34. Apart from the use of the described slide, the food items can also be taken out by simply tilting the supports 12. Apart from cleaning the supports with a jet of pressurized air or water (as described above), brushes can also be used.

FIG. 3 shows a frontal view of a dispensing storage 23. The connecting openings 5 located behind it are fully concealed by the dispensing storage 23 located in the sales area. In this embodiment, the dispensing storage 23 has a storage section for receiving the supports 12 and a dispensing unit with two dispensing bands 25 for rolls 9 located on top of each other. For simplification purposes, the illustration does not show the details of the storage section. A dispensing valve 37 for baguettes 10 arranged in this embodiment below the dispensing bands 25 also belongs to the dispensing unit. The dispensing valve 37 can be foreseen instead (or in addition to) the dispensing bands 25, and is especially suitable for dispensing oblong food items. If rolls 9 are requested, the dispensing band 25 transports them to the left in the direction of the arrow, and from there through the funnel 29 to reach a packaging device 38. Once there, they are transported in a bag.

To facilitate recognition of the dispensed food items, a device for generating information carriers—especially labels, bar codes or imprints—has been foreseen for the dispensing device. These information carriers can then be read manually by the cashiers or automatically by cashier systems. A time-consuming manual processing of the goods through checking the type of goods and their re-counting or re-weighing, is hereby eliminated. For this purpose, the dispensing devices can be equipped with laser, ink jet or thermal transfer printers. Information can be imprinted directly on the packaging (i.e., on bags, cartons or labels). Needless to say, it is also possible to generate other information carriers like electronic data carriers and to affix them to the packaging of the goods or to hand them out separately so the customer can affix them. In this case, the information carriers are affixed to the bag in the form of a bar code 39. In similar fashion, the baguette 10 can also be directly released into the manual-dispensing compartment 30. In case of a dispensing in a manual-dispensing compartment 30, it consists of an embodiment of simple and economical design. However, for hygiene purposes and for enhancing customer appeal, a more elaborate refilling device that directly packages the requested food items (rolls, for example) into bags or cartons, is foreseen.

On the right side of the dispensing device there is still an operating part 40, where the customer can enter the desired quantity and type of baked goods. Additionally, the operating part 40 can also take over the counting function for cash or card payment, for example, or be able to read other data carriers or keys.

Thus, the operating part 40 serves for entering payment methods or customer-dependent information. This customer-dependent information can, for example, be in the form of account data, cash units, names and passwords, pre-ordering numbers or quantities taken. With this, restaurant or hotel owners can have access to fresh food items after store closing, for example, and be charged later via a previously set up account. In addition, it could also be possible to sell the products directly to normal customers who just walk by through a dispensing unit that accepts cash or card payments.

In devices according to the invention boasting a particularly high capacity and very high sales potential, it also makes sense to simultaneously arrange several dispensing units within one device. In this way, two customers can, for example, request goods simultaneously using one or more storage sections, thus preventing long waiting periods.

Figure 4:
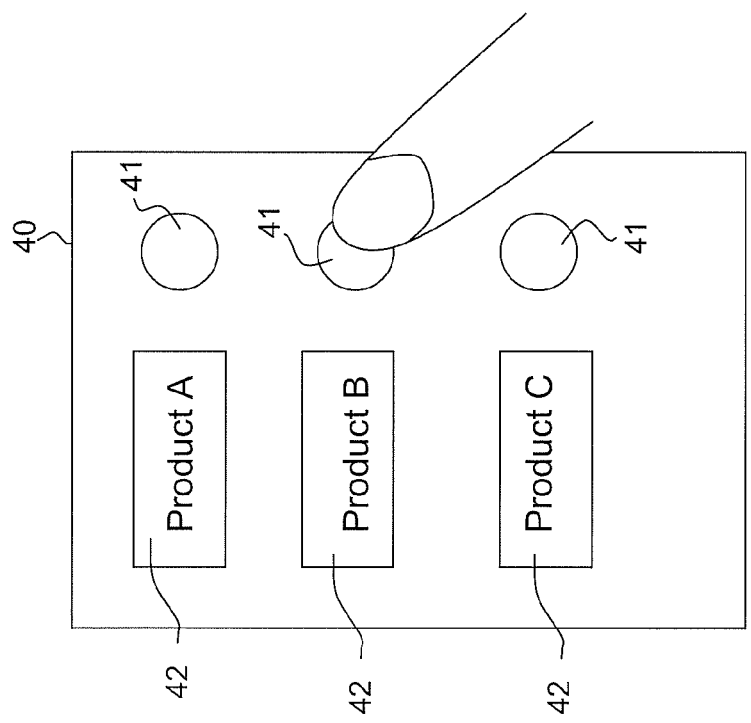
FIG. 4: a first embodiment of an operating part.

FIG. 4 shows an enlarged frontal view of a possible embodiment of an operating part according to the invention. It can be operated in the simplest way by pressing an operating element 41 several times, with each pressing corresponding to the number of the desired quantity and the operating element itself indicating the type of product. However, other solutions are conceivable as well, such as switches with which the transportation of the desired product is activated and turned off as soon as the desired quantity to be transported is reached. The installation of a keyboard or coin-/card-reading units could also be foreseen to enter quantity and type. In this case, the type and quantity of the desired products can be recognized with the help of coins, cards or other information carriers.

An information carrier 42 has been assigned to each operating element 41 with whose help the user can recognize what product he/she is selecting with it. For example, the information carrier 42 can be a sign that can be switched from the back, simply exchanged upon a product change.

Figure 5:
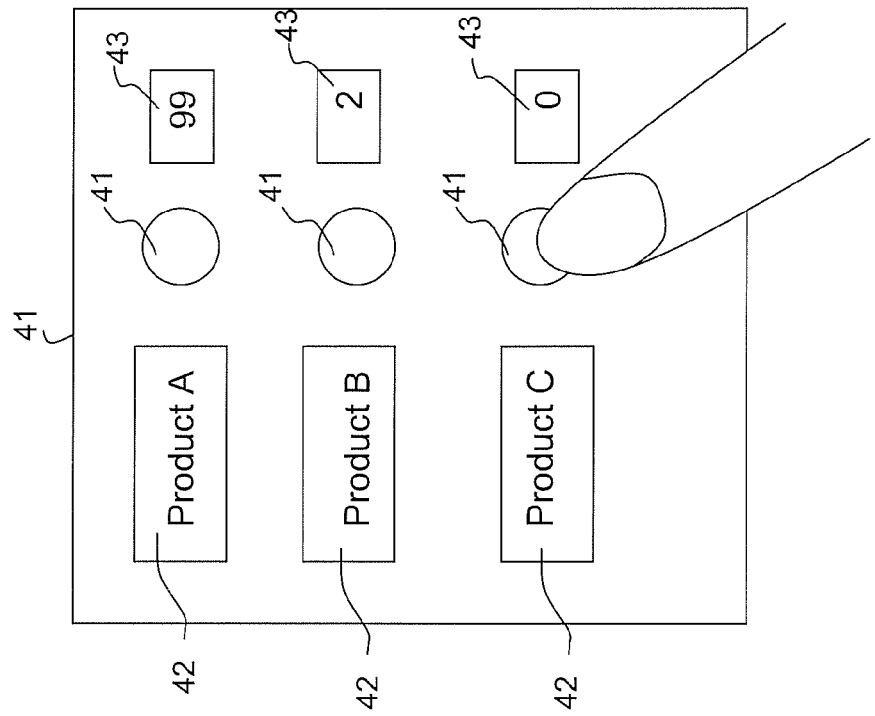
FIG. 5: a second embodiment of operating part.

FIG. 5 shows an enlarged view of an operating part 40, in which display devices 43 have additionally been foreseen to inform the user about the number of selected products. In this case, there are several possibilities that can be chosen to start the dispensing process. One possibility is to start dispensing as soon as the operating element 41 is pressed for the first time. Another alternative foresees to pre-select the type and number of products through the respective pressing of the operating elements 41 first, and to start the dispensing process after a certain pre-given time period has elapsed without any additional entries, for example. This has the advantage that two different types of rolls can be dispensed and packaged in one single bag. As a result of this, large and small packaging units (i.e. large and small bags) can be differentiated, thus saving money as well.

Figure 6:
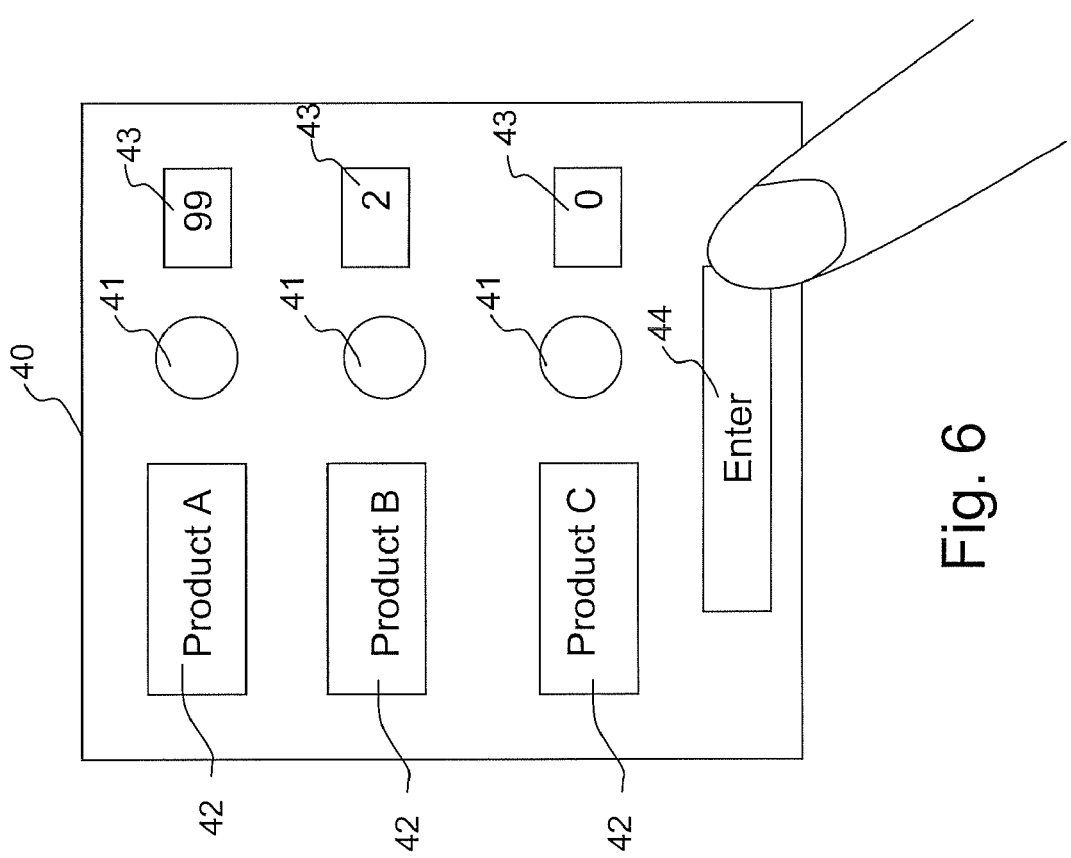
FIG. 6: a third embodiment of an operating part.

Finally, the operating part 40 shown in FIG. 6 has an additional entry key 44. With it, the user can take his/her time to select the number of product types by pressing the operating elements 41. Only after the entry takes place in the desired way, the entry key 44 is pressed to dispense the products. This kind of operation does not place the user under such time pressure and could be more attractive to seniors or the handicapped (such as visually impaired individuals) In particular. Additionally, it could also be possible to foresee an escape key to give users the chance of deleting wrong entries.

This invention is not restricted to the practical examples shown. Rather, many more variations are possible within the scope of the patent claims. For example, the structural wall-shaped separation shown can be located between the first and second sections, but also between the second and third or any other sections. Furthermore, those skilled in the art understand that apart from the transport devices and conveyors, many other embodiments and types of embodiment are known and suitable for establishing a connection through the connecting opening 5 between the sections. In especially simple designs, only one single transport device can be foreseen for all sections. The supports can also be manufactured in the most diverse way as wire baskets, cast metal parts or heat-resistant plastic, for example. Apart from the described application for the baked goods device according to the invention, it can also be used for other goods such as sausages and cured meats, canned goods, ready-to-serve meals and the like.

An execution with only two sections, such as a baking oven and a dispensing unit or a dispensing storage consisting of a storage section and a dispensing unit, is also possible.

The invention claimed is:

1. A system for storing, treating and dispensing food items, comprising:
   a first section, and a plurality of individual supports within said first section configured for receipt of individual food items placed thereon;
   a second section disposed for receipt of said supports with said food items from said first section and configured for treatment of said food items into a consumable food item;
   a third section disposed for receipt of said supports from said second section with said consumable food items and configured for storage and automatic dispensing of said consumable food items upon request;
   said second section disposed between said first and third sections; and
   a transport system configured between said first, second, and third sections defining a closed transport loop that moves in a single loop direction for said supports such that empty supports from said third section are conveyed back to said first section as supports with consumable food items therein are simultaneously conveyed from said second section to said third section; and
   at least one collection device affixed to a vertical guide configured for vertical movement, said at least one collection device further comprising a lifting element configured for horizontal movement which engages and lifts said supports onto or from the closed transport loop in association with the vertical guide.

2. The system as in claim 1, wherein the consumable food items are baked goods, said second section comprising a baking oven wherein the food items from said first section are baked.

3. The system as in claim 2, said transport system comprises a conveyor that continuously moves said supports with food items through said baking oven.

4. The system as in claim 1, wherein said first section comprises a storage space for storing a plurality of said supports with food items thereon, said transport system configured to transfer said supports with food items thereon to said second section on a first-in first-out basis.

5. The system as in claim 4, wherein said storage space comprises a controlled climate suitable for storing the food items.

6. The system as in claim 4, wherein said supports are arranged in vertically stacked levels within said storage space.

7. The system as in claim 1, wherein said third section comprises a storage space for storing a plurality of said supports with consumable food items thereon, and further comprising an automatic dispensing system that dispenses the consumable food items upon request on a first-in first-out basis.

8. The system as in claim 7, wherein said storage space comprises a controlled climate suitable for storage of the consumable food items.

9. The system as in claim 7, wherein said supports are arranged in vertically stacked levels within said storage space of said third section, said collection device configured for vertical and horizontal movement to transport the consumable food items from the second section and between different said levels within said storage space of said third section.

10. The system as in claim 1, further comprising at least one structural separation element disposed between two of said sections, said transport system configured to move said supports through an opening in said separation element.

11. The system as in claim 10, wherein said separation element comprises a wall such that said two sections are located in different rooms of a structure.

12. The system as in claim 11, further comprising an automatic self activating fire protection system configured between said two sections.

13. The system as in claim 1, further comprising an unloading device disposed in a return path of said transport system to automatically unload non-dispensed consumable food items from said supports prior to said supports being returned to said first section.

14. The system as in claim 13, further comprising a cleaning bath device disposed in said return path to clean said supports prior to said supports being returned to said first section.

15. A process for storing, treating, and dispensing baked consumable food items, comprising:
   distributing pre-baked food items on individual supports, and storing the items and supports within a storage section;
   when requested by a control system as a function of demand for the baked consumable food items, transporting the individual supports on a closed loop transport system from the storage section to a baking oven for preparation of the baked consumable food items, the closed loop transport system moving in a single loop direction;

engaging and lifting the individual supports via at least one collection device affixed to a vertical guide configured for vertical movement, said at least one collection device further comprising a lifting element configured for horizontal movement, which engages and lifts said supports onto or from the closed transport loop in association with the vertical guide;

transporting the baked consumable food items from the baking oven to a dispensing storage section;

dispensing the baked consumable food items from the dispensing storage section as requested by the control system; and returning the individual supports on the transport system to the storage section in a closed transport loop for receipt of additional pre-baked food items simultaneously with transporting the supports from the storage section to the baking oven in the closed transport loop.

16. The process as in claim 15, wherein at least said steps of storing and dispensing the baked consumable food items from the dispensing storage section are carried out on a first side of a structural separation member, and the remaining process steps are carried on the opposite side of the structural separation member.

* * * * *